June 7, 1932.　　　　J. G. PAX　　　　1,862,101
HARVESTER
Filed May 2, 1931
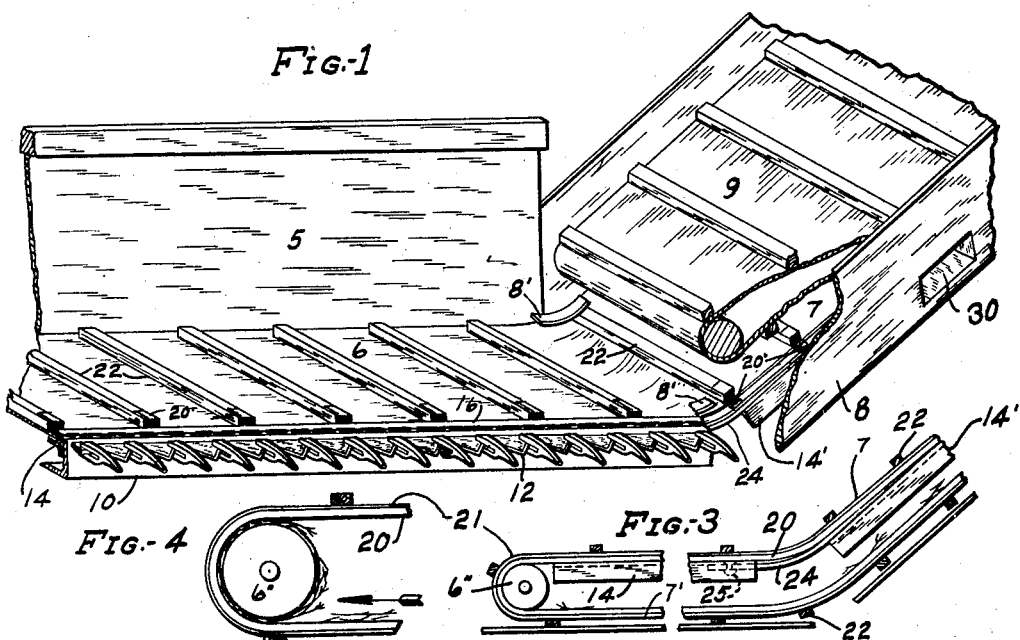
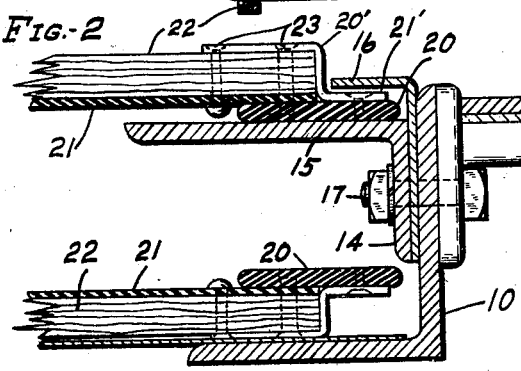
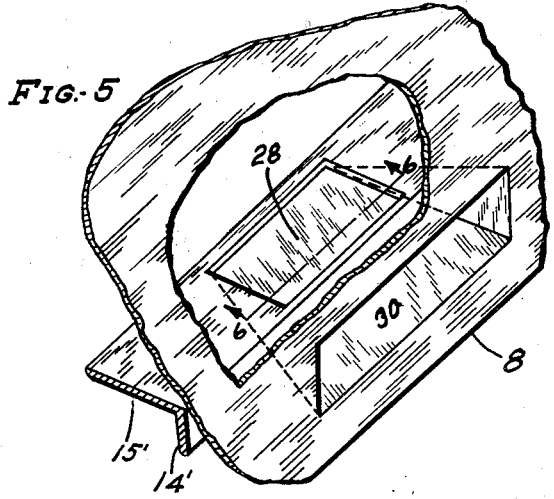
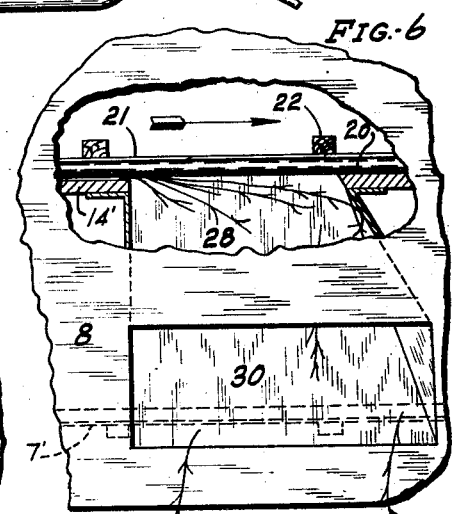
INVENTOR.
JACOB G. PAX
BY James A. Walsh,
ATTORNEY Patented June 7, 1932

1,862,101

UNITED STATES PATENT OFFICE

JACOB G. PAX, OF NEW WESTON, OHIO

HARVESTER

Application filed May 2, 1931. Serial No. 534,507.

In the operation of headers forming part of combination harvester-threshers, binders and otherwise much difficulty is experienced in conveying to the thresher the grain cut by the knives, as more or less grass, weeds and other material are caught between the forward edge of the traveling conveyor and the frame of the header and fall to the under run of the conveyor or are carried along the full distance of the conveyor and return on the reversely moving under run thereof to the outer roller, thus accumulating and eventually clogging the conveyor, so that it becomes necessary to frequently discontinue operation of the machinery to remedy the condition stated. It is the object of my invention to so improve the header as to obviate the difficulties indicated and to maintain the conveyor in free running condition to uninterruptedly carry its load into the feed-house of the thresher or elsewhere.

In the accompanying drawing, forming part hereof, Figure 1 is a fragmentary perspective of a header of well known type; Fig. 2, a transverse sectional view showing the conveyor and cutting mechanism; Fig. 3, a detail showing the flexible connection between the horizontal and inclined portions of the conveyor; Fig. 4, an enlarged fragmentary detail indicating conditions about the outer roll from accumulated material; and Figs. 5 and 6 are enlarged detail views of the chute and lateral or auxiliary discharge outlet employed in the inclined conveyor section or elevator, Fig. 6 being taken on the dotted line 6—6 in Fig. 5.

In said drawing the numeral 5 indicates the header, which, as usual, includes a platform upon which a horizontally arranged grain tight conveyor 6 is mounted and which terminates in an inclined adjustable portion 7 traveling within a delivery elevator 8, which elevator is also provided with a presser conveyor 9 adapted to cooperate with the conveyor section 7 to confine and propel the straw for discharge into a thresher or as desired.

The header platform comprises a frame 10 upon which is mounted cutting mechanism 12, as usual. Constituting a part of the header frame is an angle-bar 14 having a comparatively wide horizontal web 15, between which bar and the frame 10 is a guard 16, said parts being connected by bolts 17 passing therethrough, and which in effect form a conveyor guide, as indicated in Fig. 2. An endless conveyor comprising a rubber or other belt 20 and a web 21 preferably composed of rubberized material, connected to cross-slats 22 by rivets 23, is operatively supported on the header in a manner well known. In Fig. 2 it will be noted that said slats are as long as the width of the conveyor web, and with the web are protected by sheet metal clips 20' secured to the slats by the rivets 23 and also to the belt 20 by rivets as indicated, or otherwise, which clips maintain the parts assembled therewith in suitable relation without flexing, the portion 21' connected with the belt extending therewith well under the guard 16, while the slats are so positioned as to project above and below the guard for a purpose to appear.

The inclined portion of the conveyor includes also an angle-bar 14' and slide 15' in continuation of the similar parts 14 and 15, and which section is adjustably connected to the bar 14 by a yielding tongue 24, secured at 25, and which tongue extends into the side of the elevator 8 so that as the latter or the header platform are adjusted vertically the tongue will follow the movements of the elevator to support the conveyor traveling therein, the turn of the conveyor at the juncture of its two sections being held in operable condition by guides 8' as is common.

In operation, it will be understood that, as is common, the conveyor is moving in the direction of the elevator 8, and as the belt 20 extends an appreciable distance under the guard 16 substantially all of the cut grain readily clears the guard and passes well onto the conveyor and between the slats thereof, which slats, because of their termination at the edge of the guard, permit them to extend upwardly and considerably above as well as below the guard so that in effect the spaces between the slats become pockets for retaining and removing the material to the conveyor outlet. However, as the conveyor moves quite rapidly through the guide, any loose straws and the like which may pass under the guard 16 and work around in under the belt 20, in a well known manner, will be carried between it and the slide 15 to a chute 28 extending from the slide 15' of elevator 8, clearly indicated in Fig. 5, in which view the slatted conveyor is omitted for purposes of clearness, and through which chute material will be discharged from its outlet 30 to a receptacle or otherwise, and therefore such material will be intercepted and eliminated before reaching the usual roller (not shown) at the outer main discharge end of the elevator 8, as is common, and the difficulties referred to thus avoided. It will be understood, of course, that much of the trouble incident to the operation of header conveyers occurs at the forward edge thereof adjacent the cutting mechanism in the manner stated and that, as indicated, accumulations of material are dragged along the entire front portion of the horizontal and inclined sections of the conveyer and returned by the lower run 7' thereof to the outer roller 6" (indicated in Fig. 4) about which it winds and increases in quantity to such extent as to clog and stop the movement of the conveyer frequently and thus causing breakage or damage to its parts, but I have demonstrated in practical field use that headers equipped with my improvements are freed from surplus material in the efficient manner stated and operate indefinitely without the difficulties referred to.

I claim as my invention:

1. A header conveyer having a guide and an endless carrier traveling therein and means associated with the guide in transverse relation thereto for discharging material therefrom forwardly in relation to the header.

2. In a header conveyer having a guide and an endless carrier traveling therein, and a chute associated with the conveyer and positioned transversely therein adjacent its delivery end for receiving and discharging material therefrom.

3. In a header, the combination of a slide, a guard thereover, said slide and guard constituting a guide, an endless conveyer traveling between the slide and guard, and means associated with the guide for intercepting material carried thereby and discharging the same from the conveyer.

4. In a header, a conveyer embodying a flexible web and cross-slats, a belt connected to the web, a slide upon which the belt travels, a guard under which the belt travels, the outer end of said slats moving adjacent the guard, and means associated with the conveyer for intercepting material carried thereby and discharging it from the conveyer.

5. In a header, a conveyer comprising a horizontal and an inclined portion, yielding means between the sections over which the conveyer travels and is retained in position as the inclined section is adjusted, and a chute in the inclined section for receiving material carried by the conveyer and discharging the same therefrom.

6. In a header having an endless conveyer comprising horizontal and inclined sections, means about which the conveyer travels, a guide through which a portion of the conveyer travels, means connecting the conveyer sections whereby the inclined section may be adjusted, and means in the latter section through which material carried by the conveyer may be discharged.

7. In a header, a conveyer comprising a web and cross slats, a belt connected to the web and slats, protective means connecting said elements, a slide upon which the belt travels, and a guard under which the belt and protective means travel, said guard being positioned approximately midway of the upper and lower edges of the ends of the slats.

8. A header embodying a conveyer having a horizontal and an inclined section, a guide in each of said sections, said conveyer traveling along said guides, means for connecting the sections whereby the inclined section may be adjusted in relation to the horizontal section, and means in the inclined section for intercepting material carried along the guides by the conveyer and discharging the material therefrom.

9. A header having a conveyer, means on the forward side of the header along which a portion of the conveyer is supported and travels, and means adjacent the delivery end of the conveyer for intercepting material carried by the forward side of the conveyer and discharging the same.

10. In a header, a conveyer embodying an elevator having a main delivery end for conveying material from the upper run of its endless carrier, and a delivery outlet in its side for discharging material from the lower run of the carrier.

11. In a header, an endless grain-tight conveyer having a main delivery end from which material conveyed by the upper run of the conveyer is discharged, and an auxiliary discharge outlet for delivering material from the lower run of said conveyer.

12. In a header, an endless grain-tight conveyer adapted to discharge material from its upper run in the direction of its travel, and means associated therewith for discharging material from its lower run in a direction opposite to the material discharging from the upper run.

In testimony whereof I affix my signature.

JACOB G. PAX.